United States Patent
Purves et al.

(10) Patent No.: US 7,318,203 B2
(45) Date of Patent: Jan. 8, 2008

(54) SELECTING IMAGE PROCESSING FUNCTIONS

(75) Inventors: Gary Purves, Pierrefonds (CA); Michiel Schriever, Montréal (CA)

(73) Assignee: Autodesk Canada Co., Montreal, Quebec (CA)

( * ) Notice: Subject to any disclaimer, the term of this patent is extended or adjusted under 35 U.S.C. 154(b) by 897 days.

(21) Appl. No.: 10/407,022

(22) Filed: Apr. 3, 2003

(65) Prior Publication Data

US 2004/0207667 A1 Oct. 21, 2004

(51) Int. Cl.
*G06F 3/00* (2006.01)
*G06F 3/14* (2006.01)

(52) U.S. Cl. ............... 715/853; 715/719; 715/744; 715/769; 715/838; 715/777; 715/501.1

(58) Field of Classification Search ............ 715/719, 715/744, 764, 765, 777, 835, 838, 853, 866, 715/854, 856, 501.1, 769; 345/156–158, 345/163, 173, 179
See application file for complete search history.

(56) References Cited

U.S. PATENT DOCUMENTS

| 5,656,804 | A | * | 8/1997 | Barkan et al. ......... 235/472.01 |
| 5,786,284 | A | | 7/1998 | Matsuoka et al. |
| 5,892,506 | A | | 4/1999 | Hermanson |
| 6,269,180 | B1 | | 7/2001 | Sevigny |
| 6,773,177 | B2 | * | 8/2004 | Denoue et al. ............... 400/88 |
| 2004/0230612 | A1 | * | 11/2004 | Mattson et al. .......... 707/104.1 |
| 2005/0275626 | A1 | * | 12/2005 | Mueller et al. ............. 345/156 |
| 2006/0064716 | A1 | * | 3/2006 | Sull et al. ..................... 725/37 |

* cited by examiner

*Primary Examiner*—X. L. Bautista
(74) *Attorney, Agent, or Firm*—Gates & Cooper LLP

(57) ABSTRACT

An image processing function is selected via a graphical user interface (GUI) 902 that receives input commands from manually operated input means 102-103, 106 configured with activation means. Image data 707, 1206 is selected by placing a pointer 905 operated by the input means over its representation 919 within said GUI 902 and activating said activation means. In response to a translation 1301, 1303, 1402 of said representation 919 over a hierarchical representation 925 of said function within said GUI 902, said function is initialised according to said hierarchy with said selected image data 1206 as default data. In response to said initialisation, said GUI 902 is updated. In response to deactivating said activation means, said function is configured for processing said image data according to input received from said input means. The updated representation 1403 of said function includes a representation 919 of said image data 1206.

21 Claims, 16 Drawing Sheets

SELECTING IMAGE PROCESSING FUNCTIONS

CROSS-REFERENCE TO RELATED APPLICATIONS

This application is related to the following commonly-assigned patents, which are incorporated by reference herein:

U.S. Pat. No. 5,786,824, filed on Apr. 10, 1996 and issued on Jul. 28, 1998, by Benoit Sevigny, entitled "PROCESSING IMAGE DATA";

U.S. Pat. No. 5,892,506, filed on Mar. 18, 1996 and issued on Apr. 6, 1999, by David Hermanson, entitled "MULTI-TRACK ARCHITECTURE FOR COMPUTER-BASED EDITING OF MULTIMEDIA SEQUENCES";

U.S. Pat. No. 6,269,180, filed on Apr. 9, 1997 and issued on Jul. 31, 2001, by Benoit Sevigny, entitled "METHOD AND APPARATUS FOR COMPOSITING IMAGES";

BACKGROUND OF THE INVENTION

1. Field of the Invention

The present invention relates to apparatus for processing image data and a method of selecting image data processing functions via a graphical user interface.

2. Description of the Related Art

Systems for processing image data, having a processing unit, storage devices, a display device and a stylus-like manually operable input device (such as a stylus and touchtablet combination) are shown in U.S. Pat. Nos. 5,892,506; 5,786,824 and 6,269,180 all assigned to the present Assignee. In these aforesaid systems, it is possible to perform many functions upon stored image data in response to an operator manually selecting a function from a function menu.

Recently, in such systems as "Toxic", "Fire" and "Inferno", licensed by the present Assignee, the number of functions that may be performed have increased significantly. Thus, for example, there has been a tendency towards providing functions for special effects, compositing and editing on the same platform.

Function selection is often done via graphical user interfaces (GUIs) in which menus are displayed from which a selection may be made. A function selection using a menu is achieved by moving a cursor over to a selection position within the menu by operation of the stylus. The particular function concerned is selected by placing the stylus into pressure; an operation logically similar to a mouse click. Menus of this type are used instead of pull-down menus in systems where stylus-like input devices are preferred, because it is necessary to maintain stylus pressure while menu selection takes place with such pull-down menus. Such an operation places unnecessary strain on the wrists and fingers of an operator and is therefore not preferred in applications that make significant use of stylus-like devices.

The purpose of menus is thus to group functions as function families based upon either their processing functionality (for instance all the functions allowing an image processing user to access and manage image data files, grouped in a "File" menu) or the commonality of data such they process (for instance all the functions allowing an image editor to edit the Red, Green and Blue color component values of image data, grouped in a "Color" menu). Having regard to the stated increasing number of available image processing functions, the situation arises frequently wherein an image processing system user needs to recursively access functions nested in different families, i.e. menus. However, traditional instructions set design, which includes the graphical user interface and menus thereof, requires that image data be re-selected every time a function of a different family is selected, whereby the operational strain problem stated above is compounded by the frequent need to repeat image data selection unnecessarily.

Furthermore, operators and artists are under increasing pressure to increase the rate at which work is finished. Being able to work with systems of this type quickly and efficiently is not facilitated if complex menu structures are provided or manipulation tools are provided that are not intuitive to the way artists work.

BRIEF SUMMARY OF THE INVENTION

According to a first aspect of the present invention, there is provided an apparatus for processing image data, comprising memory means, processing means, display means and manually operable input means configured with activation means, wherein said memory means stores said image data and instructions and said processing means is configured by said instructions to perform the steps of selecting image data by way of placing a pointer operated by said input means over its representation within a graphical use interface output to said display means and activating said activation means; in response to a translation of said representation over a hierarchical representation of said function within said graphical user interface, initialising said function according to said hierarchy with said selected image data as default data; in response to said initialisation, updating said graphical user interface, whereby in response to deactivating said activation means, said function is configured for processing said image data according to input received from said input means and the representation of said function includes a representation of said image data.

According to a another aspect of the present invention, there is provided a method of selecting an image processing function via a graphical user interface for receiving input commands from manually operated input means configured with activation means, wherein image data is selected by way of placing a pointer operated by said input means over its representation within said graphical use interface and activating said activation means; in response to a translation of said representation over a hierarchical representation of said function within said graphical user interface, said function is initialised according to said hierarchy with said selected image data as default data; in response to said initialisation, said graphical user interface is updated and in response to deactivating said activation means, said function is configured for processing said image data according to input received from said input means, whereby the representation of said function includes a representation of said image data.

According to yet another aspect of the present invention, there is provided a computer-readable medium carrying instructions for processing image data which, when processed by a computer including display means and manually operated input means configured with activation means, configure said computer to perform the steps of selecting image data by way of placing a pointer operated by said input means over its representation within a graphical use interface output to said display means and activating said activation means; in response to a translation of said representation over a hierarchical representation of said function within said graphical user interface, initialising said function according to said hierarchy with said selected image data as default data; in response to said initialisation, updating said graphical user interface, whereby in response to deactivating said activation means, said function is configured for processing said image data according to input received from said input means and the representation of said function includes a representation of said image data.

According to still another aspect of the present invention, there is provided a computer programmed for processing image data, said computer comprising memory means, processing means, display means and manually operable input means configured with activation means, wherein said memory means stores said image data and instructions and said computer is configured by said instructions to perform the steps of selecting image data by way of placing a pointer operated by said input means over its representation within a graphical use interface output to said display means and activating said activation means; in response to a translation of said representation over a hierarchical representation of said function within said graphical user interface, initialising said function according to said hierarchy with said selected image data as default data; in response to said initialisation, updating said graphical user interface, whereby in response to deactivating said activation means, said function is configured for processing said image data according to input received from said input means and the representation of said function includes a representation of said image data.

WRITTEN DESCRIPTION OF THE BEST MODE FOR CARRYING OUT THE INVENTION

FIG. 1

Figure 1:
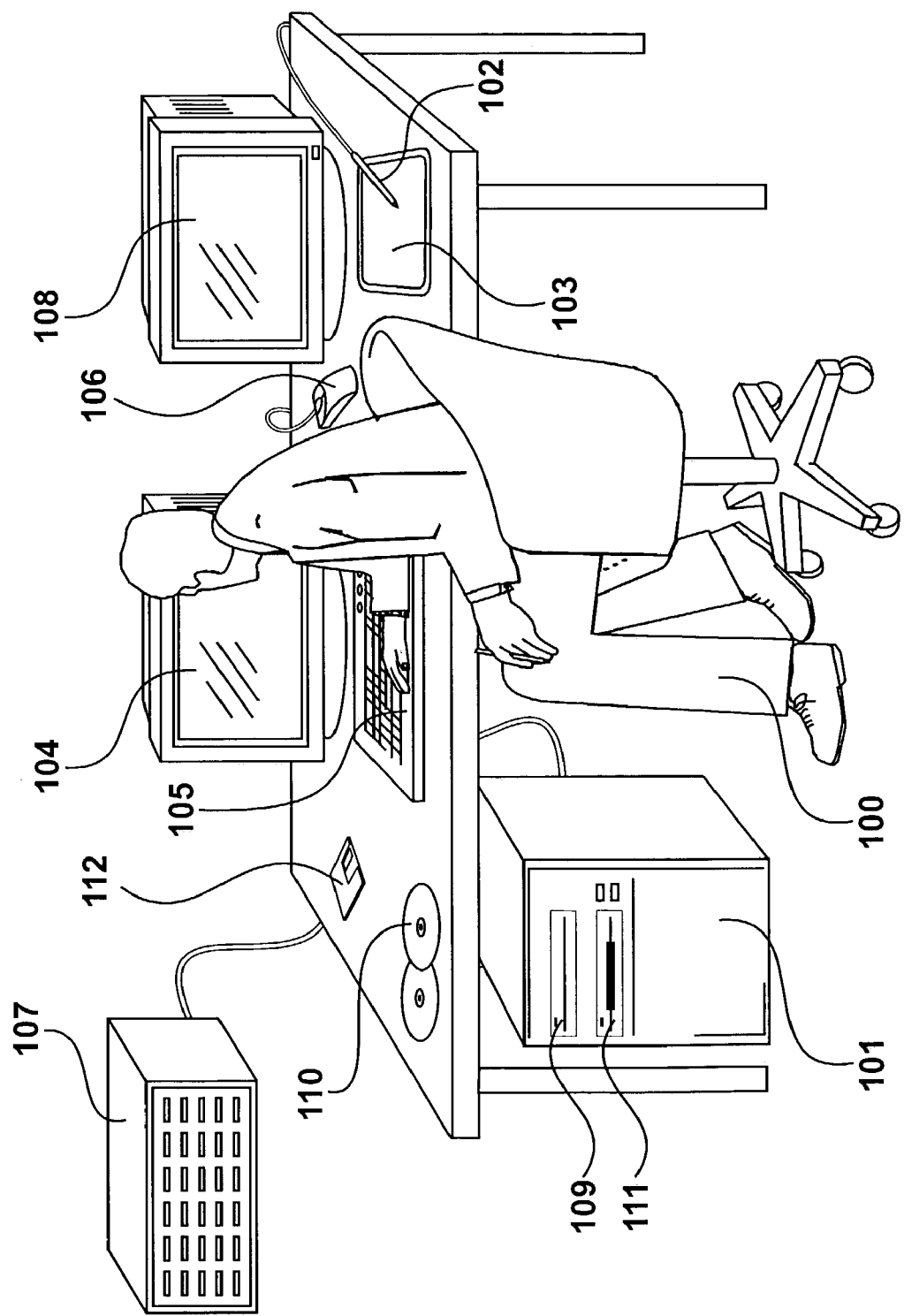
FIG. 1 shows a system for processing image data that embodies the present invention.

A computer editing system, including a computer system video display unit and a high-resolution monitor, is shown in FIG. 1.

In the system shown in FIG. 1, instructions are executed upon a graphics workstation operated by an image editor or artist 100, the architecture and components of which depends upon the level of processing required and the size of images being considered. Examples of graphics-based processing systems that may be used for very-high-resolution work include an ONYX II manufactured by Silicon Graphics Inc, or a multiprocessor workstation 101 manufactured by IBM Inc. The processing system 101 receives instructions from an artist by means of a stylus 102 applied to a touch tablet 103, in response to visual information received by means of a visual display unit 104. In addition, data may be supplied by said artist via a keyboard 105 or a mouse 106, with input source material being received via a real-time digital video recorder or similar equipment configured to supply high-bandwidth frame data.

The processing system 101 includes internal volatile memory in addition to bulk, randomly-accessible storage, which is provided by means of a RAID disk array 107. Output material may also be viewed by means of a high-quality broadcast monitor 108. System 101 includes an optical data-carrying medium reader 109 to allow executable instructions to be read from a removable data-carrying medium in the form of an optical disk 110, for instance a DVD-ROM. In this way, executable instructions are installed on the computer system for subsequent execution by the system. System 101 also includes a magnetic data-carrying medium reader 111 to allow object properties and data to be written to or read from a removable data-carrying medium in the form of a magnetic disk 112, for instance a floppy-disk or a Zip™ disk.

FIG. 2

Figure 2:
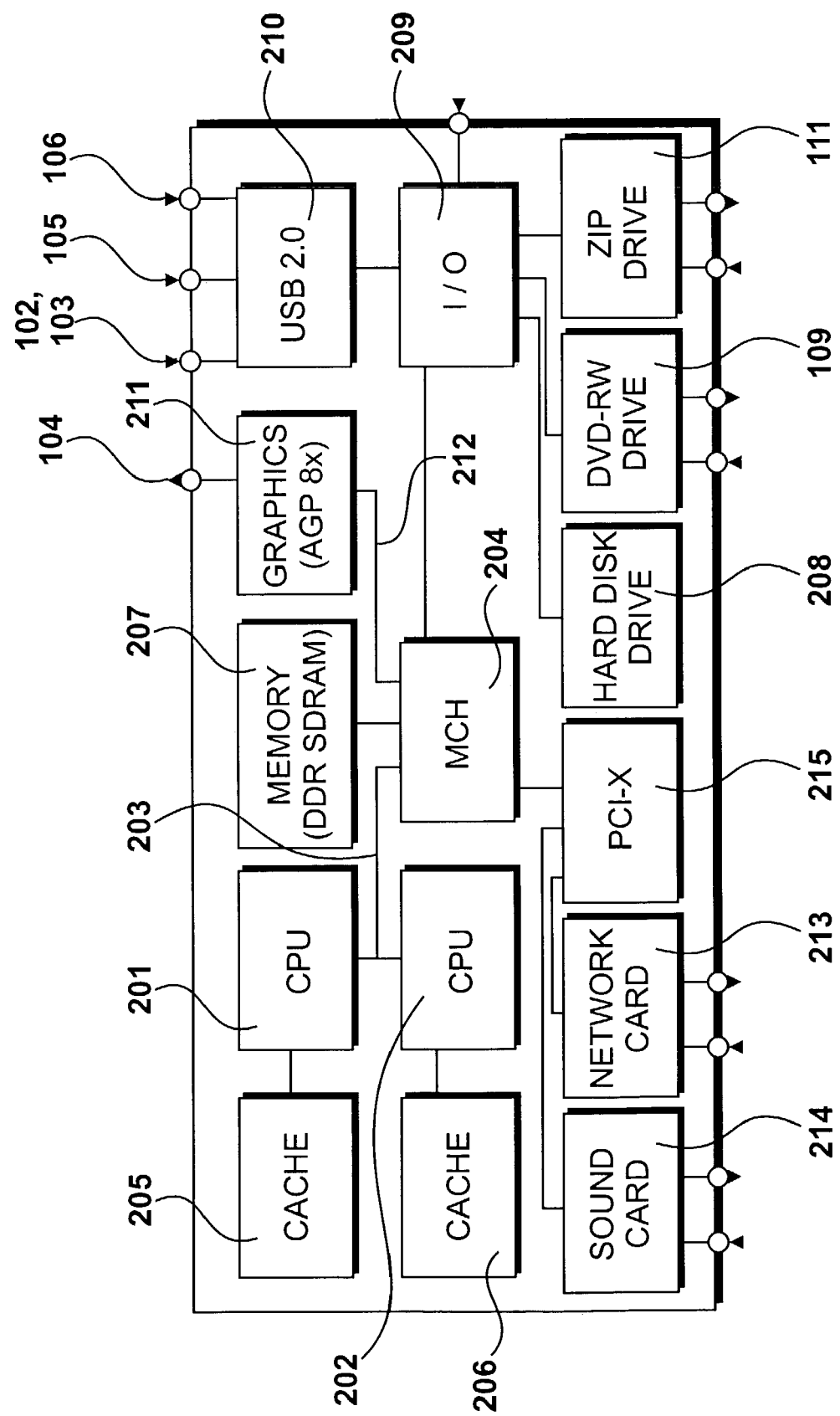
FIG. 2 details the hardware components of the computer system shown in FIG. 1, including a memory.

The components of computer system 101 are further detailed in FIG. 2 and, in the preferred embodiment of the present invention, said components are based upon Intel® E7505 hub-based Chipset.

The system includes two Intel® Pentium™ Xeon™ DP central processing units (CPU) 201, 202 running at three Gigahertz, which fetch and execute instructions and manipulate data with using lntel®'s Hyper Threading Technology via an Intel® E7505 533 Megahertz system bus 203 providing connectivity with a Memory Controller Hub (MCH) 204. CPUs 201, 202 are configured with respective high-speed caches 205, 206 comprising at least five hundred and twelve kilobytes, which store frequently-accessed instructions and data to reduce fetching operations from a larger memory 207 via MCH 204. The MCH 204 thus co-ordinates data flow with a larger, dual-channel double-data rate main memory 207, which is between two and four gigabytes in data storage capacity and stores executable programs which, along with data, are received via said bus 203 from a hard disk drive 208 providing non-volatile bulk storage of instructions and data via an Input/Output Controller Hub (ICH) 209. Said ICH 209 similarly provides connectivity to DVD-ROM re-writer 109 and ZIP™ drive 111, both of which read and write data and instructions from and to removable data storage media. Finally, ICH 209 provides connectivity to USB 2.0 input/output sockets, to which the stylus 102 and tablet 103 combination, keyboard 105 and mouse 106 are connected, all of which send user input data to system 101.

A graphics card 211 receives graphics data from CPUs 201, 202 along with graphics instructions via MCH 204. Said graphics accelerator 211 is preferably coupled to the MCH 204 by means of a direct port 212, such as the direct-attached advanced graphics port 8X (AGP 8X) promulgated by the Intel® Corporation, the bandwidth of which exceeds the bandwidth of bus 203. Preferably, the graphics card 211 includes substantial dedicated graphical processing capabilities, so that the CPUs 201, 202 are not burdened with computationally intensive tasks for which they are not optimised.

Network card 213 provides connectivity to the framestore 103 by processing a plurality of communication protocols, for instance a communication protocol suitable to encode and send and/or receive and decode packets of data over a Gigabit-Ethernet local area network. A sound card 214 is provided which receives sound data from the CPUs 201, 202 along with sound processing instructions, in a manner similar to graphics card 211. Preferably, the sound card 214 includes substantial dedicated digital sound processing capabilities, so that the CPUs 201, 202 are not burdened with computationally intensive tasks for which they are not optimised. Preferably, network card 213 and sound card 214 exchange data with CPUs 201, 202 over system bus 203 by means of Intel®'s PCI-X controller hub 215 administered by MCH 204.

The equipment shown in FIG. 2 constitutes a typical workstation comparable to a high-end IBM™ PC compatible or Apple™ Macintosh.

FIG. 3

Figure 3:
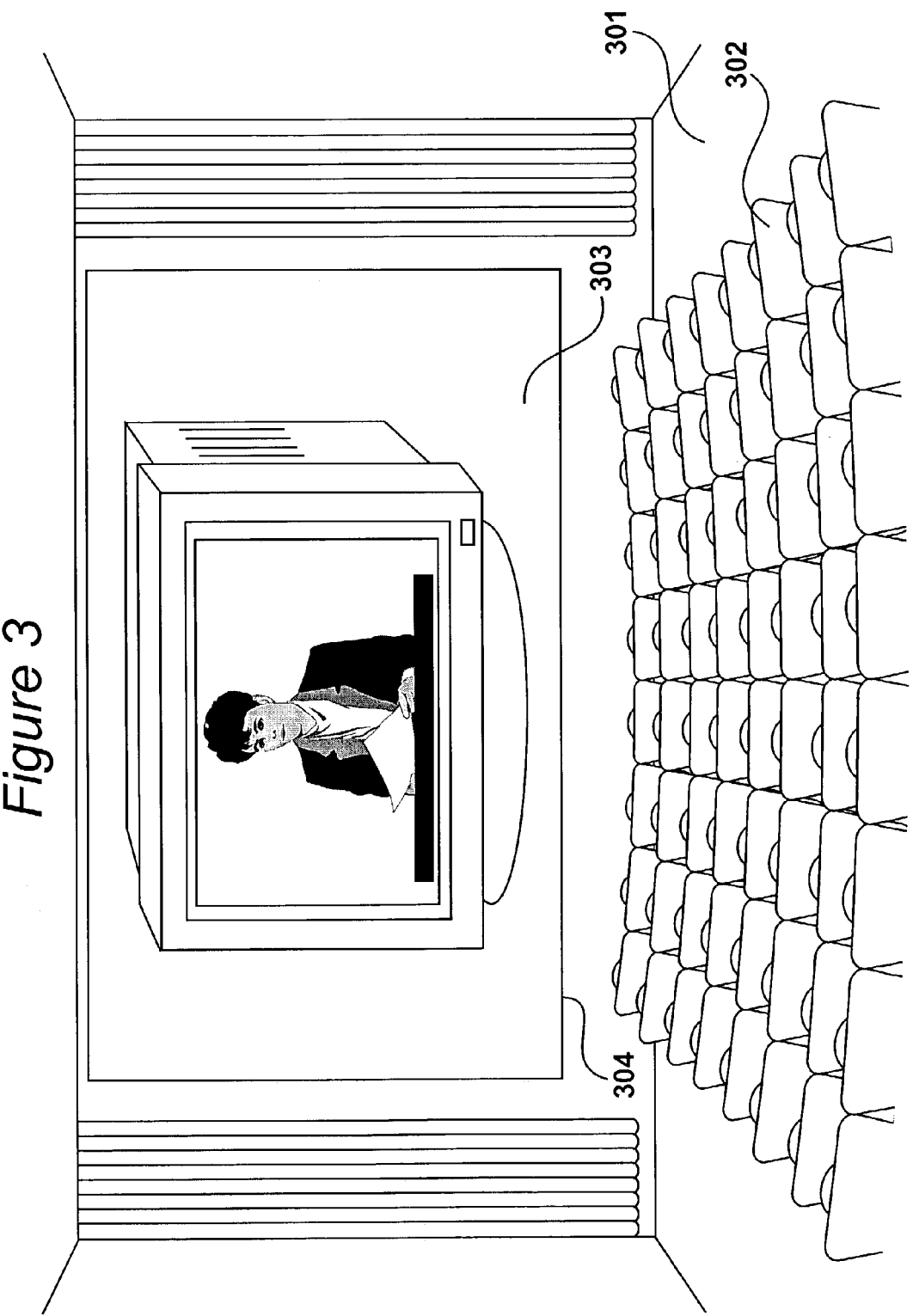
FIG. 3 illustrates a scene shown in a movie theatre comprising image data processed by the system shown in FIGS. 1 and 2.

A conventional movie theatre 301 is shown in FIG. 3, in which an audience 302 is watching a scene 303 projected onto a movie screen 304. Scene 303 comprises a sequence of many thousands of image frames exposed on film stock, thus having a very high resolution necessary to realistically portrait the contents thereof when magnified by the projector onto screen 304, having regard to the amount of detail observable by audience 302 therein.

As was detailed in the introduction above, it is known to digitise source image frames contributing to the sequence 303 for the purpose of post-production editing and the implementation of image enhancements. In order to facilitate said editing and enhancements, various image data processing techniques have been developed to improve the interaction of an image editor such as artist 100 therewith, and the workflow thereof. Specifically, one such technique involves the referencing of said digitised image frames and the various post-production processes applied thereto within a hierarchical data processing structure, also known as a process tree or scene graph, whereby said image editor may intuitively and very precisely edit any component or object of any digitised image frame referenced therein.

FIG. 4

Figure 4:
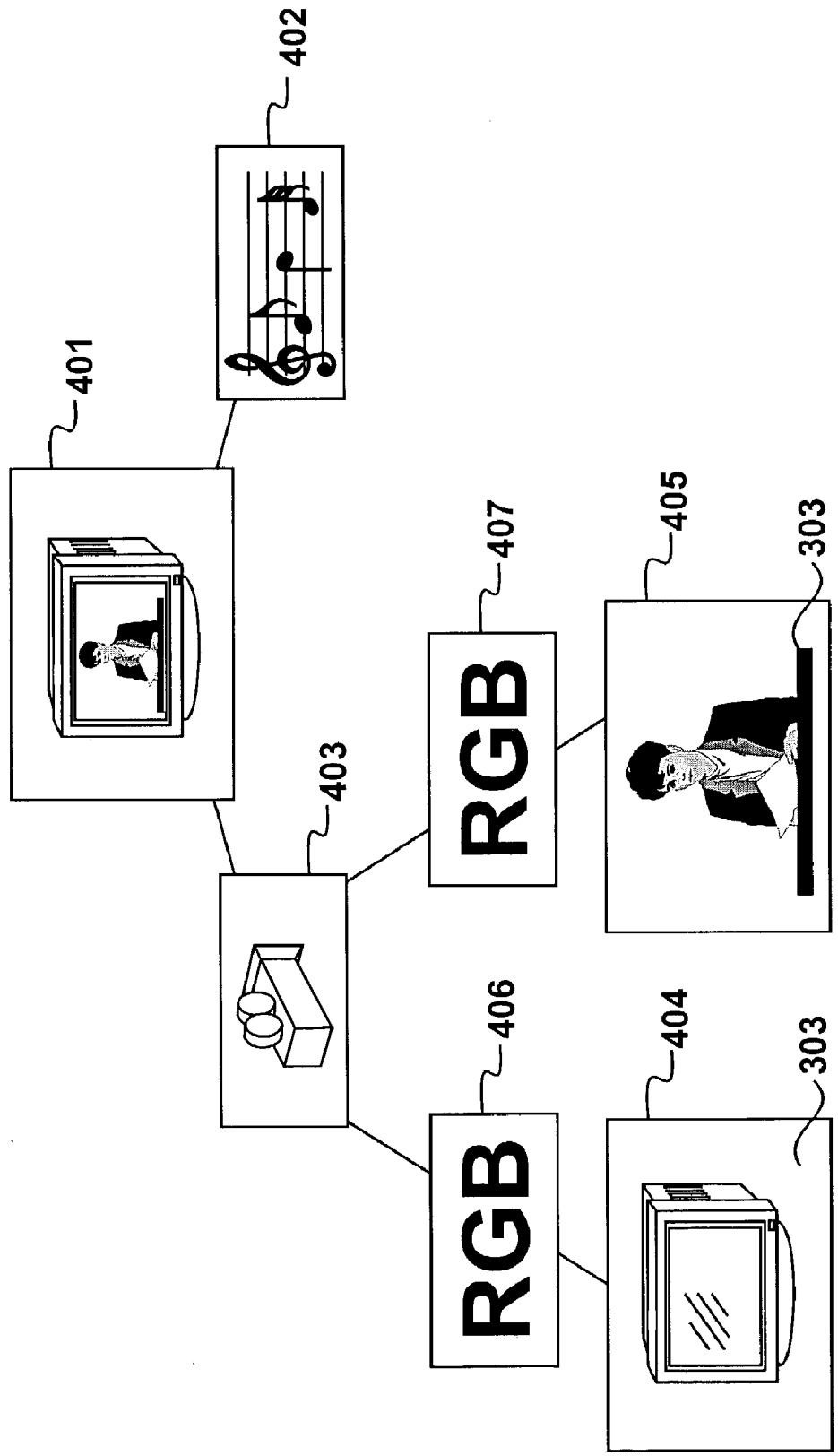
FIG. 4 further illustrates the image data and structure thereof shown in FIG. 3.

A simplified example of the process tree of sequence 303 is shown in FIG. 4.

In compositing applications processed by the processing system shown in FIGS. 1 and 2, the scene graph of sequence 303 is traditionally represented as a top-down tree structure, wherein the topmost node 401 pulls all the data output by nodes depending therefrom in order to output final output data, some of which will be image data and some of which may be audio data, for instance generated by a first audio child node 402.

In order to generate image data by way of image rendering, a fundamental requirement is the definition of a rendering camera and its view frustrum, as defined by a rendering node 403. In the example, said final output image frame is a composited image frame which includes a background image frame depicting a TV set and a foreground image frame depicting a TV presenter to be keyed therewith. Consequently, the TV background image frame is output by a frame node 404 and the presenter foreground image frame is output by a frame node 405, wherein said frame nodes are children of rendering node 403.

If the R,G,B color component values of both the background and foreground image frames require correction independently of one another before said final frame is rendered, color-correction nodes 406, 407 may be added as respective parent nodes of frame nodes 404, 405, wherein said nodes 406, 407 respectively pull the image data output by frame nodes 404, 405 in order to process it and effect said correction before rendering node 403 can render said color-corrected final output frame.

The scene graph shown in FIG. 4 is very small is so restricted for the purpose of not obscuring the present description unnecessarily but it will be readily apparent to those skilled in the art that such scene graphs usually involve hundreds or even thousands of such hierarchical data processing nodes.

FIG. 5

Figure 5:
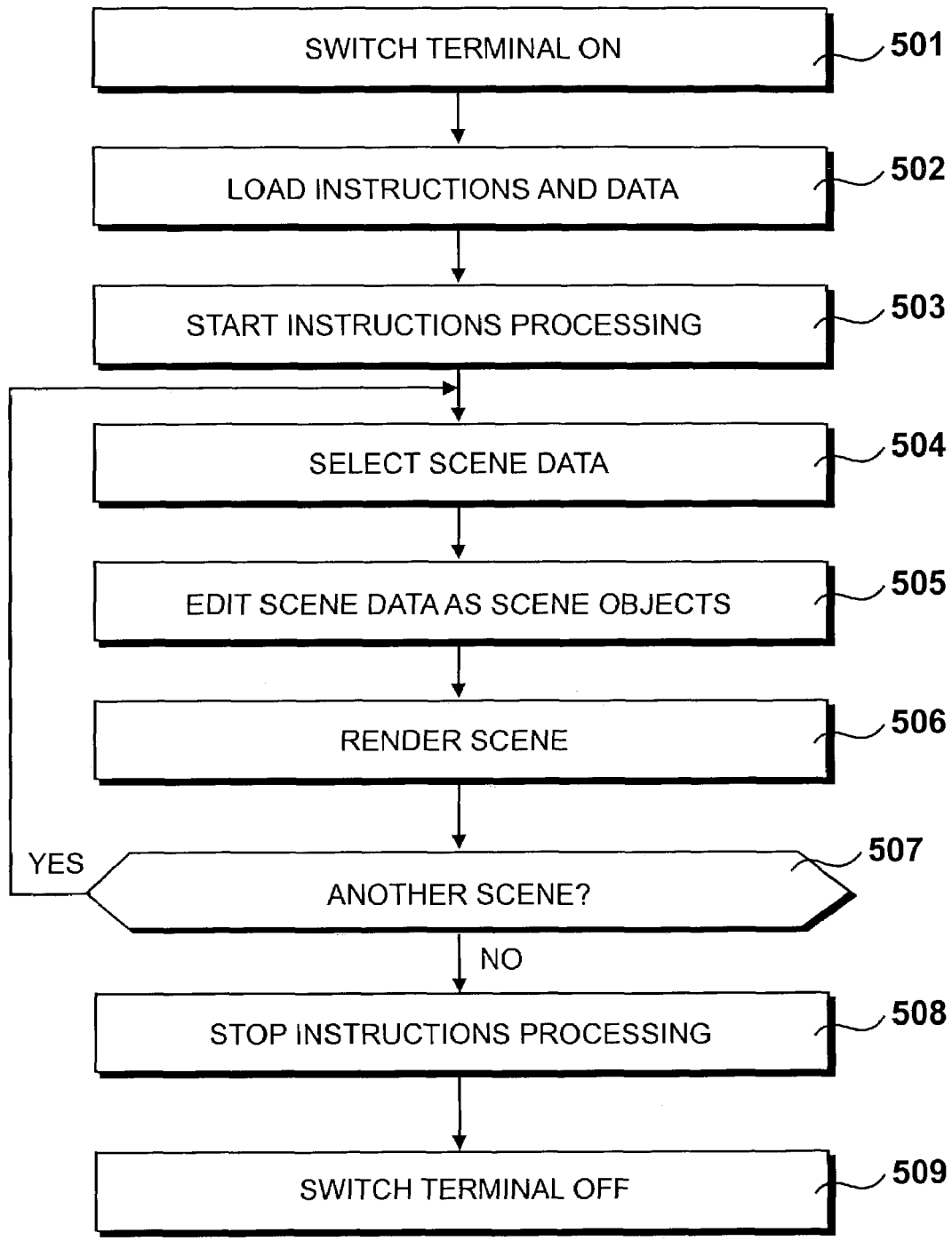
FIG. 5 details the processing steps according to which an image editor operates the image processing system shown in FIGS. 1 and 2 according to the present invention.

The processing steps according to which artist 100 may operate the image processing system shown in FIGS. 1 and 2 according to the present invention are described in FIG. 5.

At step 501, artist 100 switches on the image processing system and, at step 502, an instruction set is loaded from hard disk drive 208, DVD ROM 110 by means of the optical reading device 109 or magnetic disk 112 by means of magnetic reading device 111, or even a network server accessed by means of network card 213.

Upon completing the loading of step 502 of instructions set into memory 207, CPUs 201, 202 may start processing said set of instructions, also known as an application, at step 503. User 100 may then select a scene graph such as described in FIG. 4 at step 504. Upon performing the selection of step 504, artist 100 may now perform a variety of processing functions upon the image data of the scene graph at step 505, whereby a final composite image frame may then output at step 506 by means of rendering the edited scene.

At step 507, a question is asked as to whether the image data of another scene requires editing at step 505 and rendering at step 506. If the question of step 507 is answered positively, control is returned to step 504, whereby another scene may then be selected. Alternatively, if the question of 507 is answered negatively, signifying that artist 100 does not require the functionality of the application loaded at step 502 anymore and can therefore terminate the processing thereof at step 508. Artist 100 is then at liberty to switch off the image processing system 101 at step 509.

FIG. 6

Figure 6:
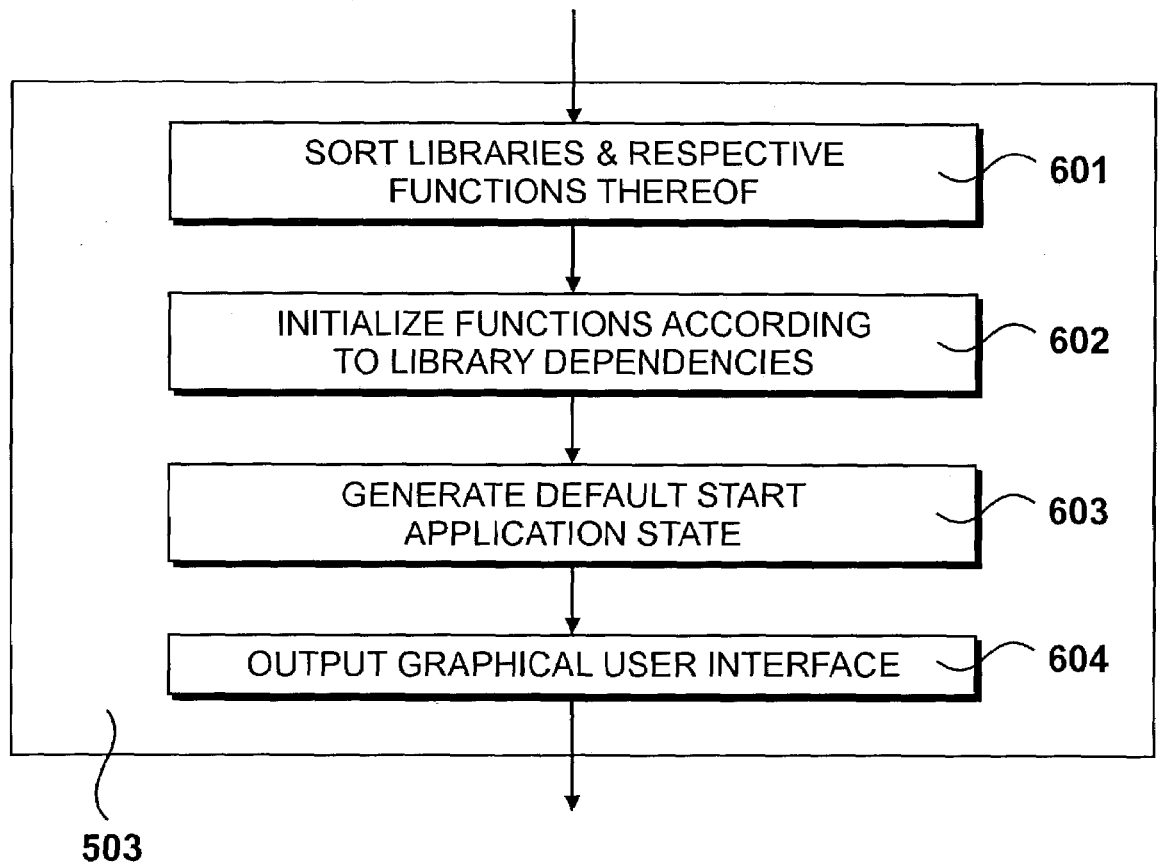
FIG. 6 further details a step of starting the processing of image data processing instructions shown in FIG. 5.

The step 503 of starting the processing of image data processing instructions loaded at step 502 is further described in FIG. 6, more particularly the initialization of the instructions run-time environment.

At step 601, a loading module loaded first at the previous step 502 sorts function libraries and the respective functions thereof in order to define a function dependency list, which comprehensively references all of the inter-dependencies existing between all of the functions of said instructions set. In effect, said dependency list references said inter-dependencies as a hierarchy of all of the data-processing functions implemented within an image-processing application, since each of said functions inherits definitions, functionality and parameters from its respective library, but may share all or a portion of these with other functions depending from other libraries. The concept of function dependencies is well known to those skilled in the art and is paramount to achieve adequate processing of input data, because each of said functions must "know" the type of data it may receive from a sibling function, i.e. a function belonging to the same library, and also the type of data it outputs itself, in order to determine which alternative library should be called if said processed data shall be forwarded to a processing function belonging to a different library.

Upon completing the sorting operation of step 601, all of the functions defined and declared within said set of instructions can now be initialized at step 602 according to the library dependencies processed and generated at step 601.

At the next step 603, all of the processing functions to be performed by CPUs 201, 202 have now been initialized, wherein the runtime environment of image processing system as described in FIG. 2 is configured for operation and the default application state is correspondingly generated.

Said default state may correspond to the first library of functions made available to user 100 for interaction therewith, before any image data processing has taken place. In a preferred embodiment of the present invention, said default library is for instance a library grouping file management functions allowing said user 100 to access, select, read and/or write image data files stored at framestore 107, e.g. providing the standard functions of a conventional file browser. In order to facilitate said interaction of said user 100 with the set of instructions initialized at run-time, the graphical user interface of said set instructions is output to VDU 104 at the next step 604, wherein menus representing said file management functions are displayed in accordance with the default library of the previous step 603.

FIG. 7

Figure 7:
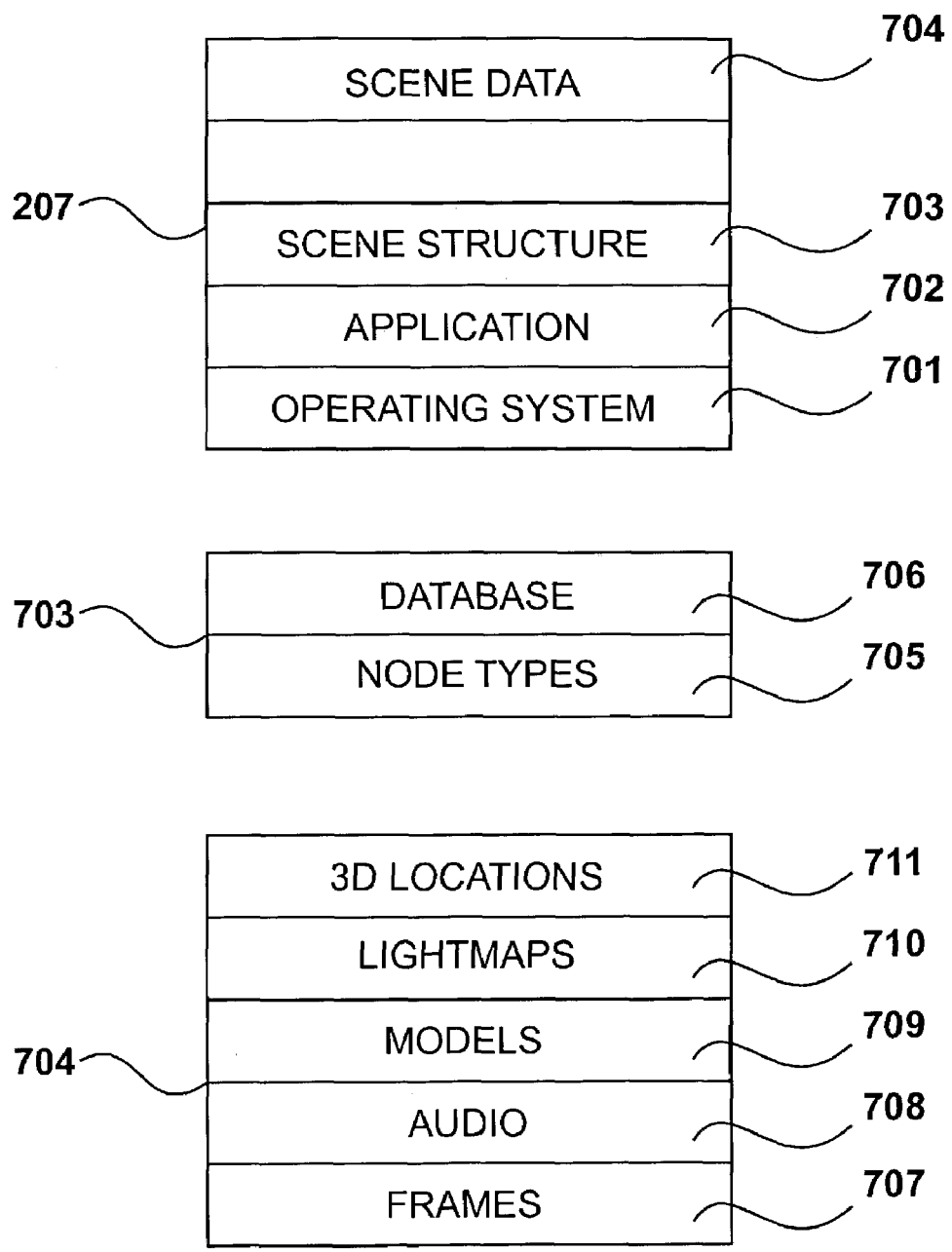
FIG. 7 illustrates the contents of the memory shown in FIG. 2.

The contents of main memory 207 subsequently to the selection step 404 of a scene are further detailed in FIG. 7.

An operating system is shown at 701 which comprises a reduced set of instructions for CPUs 201, 202 the purpose of which is to provide image processing system 101 with basic functionality. Examples of basic functions include for instance access to files stored on hard disk drive 208 or DVD/CD-ROM 110 or ZIP™ disk 112 and management thereof, network connectivity with a network server and framestore 107, interpretation and processing of the input from keyboard 105, mouse 106 or graphic tablet 102, 103. In the example, the operating system is Windows XP™ provided by the Microsoft corporation of Redmond, Calif., but it will be apparent to those skilled in the art that the instructions according to the present invention may be easily adapted to function under different other known operating systems, such as IRIX™ provided by Silicon Graphics Inc or LINUX, which is freely distributed.

An application is shown at 702 which comprises the instructions loaded at step 402 that enable the image processing system 101 to perform steps 503 to 507 according to the invention within a specific graphical user interface displayed on VDU 104. Application data is shown at 703 and 704 and comprises various sets of user input-dependent data and user input-independent data according to which the application shown at 702 processes image data.

Scene structure 703 comprises a plurality of node types 705, each of which provides a specific functionality in the overall task of rendering a scene according to step 506. Said node types 705 are structured according to a hierarchy 706, which may preferably but not necessarily take the form of a database, the purpose of which is to reference the order in which various node types 705 process scene data 704.

A number of examples of scene data 704 are provided for illustrative purposes only and it will be readily apparent to those skilled in the art that the subset described is here limited only for the purpose of clarity. Said scene data 704 may include image frames 707 acquired from framestore 107, for instance a background image frame digitised from film and subsequently stored in framestore 107, portraying a TV set and a foreground image frame digitised from film and subsequently stored in framestore 107, portraying a TV presenter.

Said scene data 704 may also include audio files 708 such as musical score or voice acting for the scene structure selected at step 504. Said scene data 704 may also include pre-designed three-dimensional models 709, such as a camera object required to represent the pose of the rendering origin and frustrum of node 403 within the compositing environment. In the example, scene data 704 includes lightmaps 710, the purpose of which is to reduce the computational overhead of CPUs 201, 202 when rendering the scene with artificial light sources. Scene data 704 finally include three-dimensional location references 711, the purpose of which is to reference the position of the scene objects edited at step 505 within the three-dimensional volume of the scene compositing environment.

FIG. 8

Figure 8:
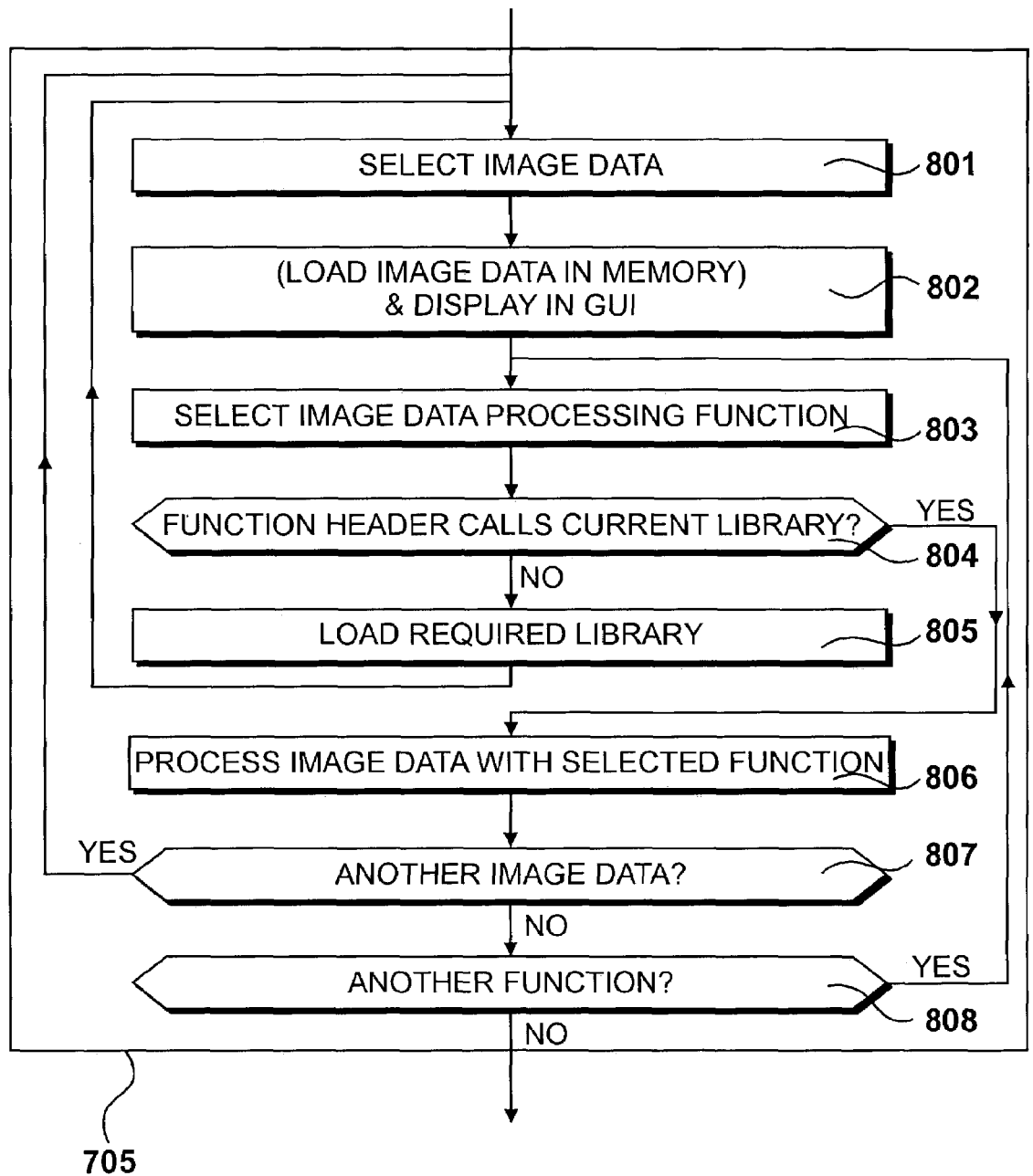
FIG. 8 details the processing step according to which the scene data shown in FIGS. 3 and 4 is edited in an image processing system comparable to the system shown in FIG. 1 but configured according to the known prior art, including a reselection.

The processing step 505 according to which scene data 303 is edited as scene objects 401 to 407 in an image processing system comparable to system 101 but configured according to the known prior art, is further described in FIG. 8.

Having regard to the size a scene graph such as described in FIG. 4 can reach, which can amount to thousands of data processing nodes when editing movie sequences, the scene data 504 thereof is preferably loaded as metadata when said scene graph is selected at step 504. Said metadata defines the type of data, such as an image frame 707 or a three-dimensional model 709, unlike scene structure data 503 which defines the processing functions and sequence thereof to be performed thereupon. Thus, metadata is preferred for scene data as the totality of the various scene data elements may well exceed the capacity of memory 207 of system 101.

In this context, a user 100 first selects image data at step 801, wherein said selection is preferably performed upon a representation of said scene data 504 generated from said metadata, whereby such a representation is known to those skilled in the art as a proxy, for instance a frame "thumbnail" image.

Upon performing the selecting step 801, the actual scene data is accessed, for instance an image frame 707 or a sequence thereof stored at framestore 107, and loaded in main memory 207 at the next step, 802. Whilst the representation of said scene data loaded at step 802 may not differ within the GUI of the application, wherein the image frame 707 or sequence thereof remains represented as an image thumbnail, said representation now points to data stored in main memory 207 and readily processible by CPUs 201, 202.

User 100 may now select an appropriate image data processing function with which to process said loaded image data at the next step 803 and, upon performing said function selection, a question is asked at step 804 as to whether the header of said function calls the library upon which the current application state is based, as described in FIG. 6. In other words, upon user 100 selecting a data processing function, the dependency or the dependencies thereof are looked-up in order to determine if said selected function inherits data definition and one or a plurality of group-wide characteristic from said current library in order to process the image data selected at step 801.

If the question of step 804 is answered negatively, the library required for the function selected at step 803 to process the image data selected at step 801 must be loaded, whereby in image processing systems configured to the known prior art, control is returned to step 801 such that user 100 has to re-select the image data that was selected prior to selecting the function which requires an alternative library.

Indeed, the library loading step 805 performed in image processing systems configured according to the known prior art generates a new application state wherein the functions and graphical user interface thereof are initialized in their default state, thus configured with default, unity data. In effect, said re-selection must be performed in order to "point" the function of the newly-loaded library to the image data it must process, e.g. replace the default, unity data with actual image data. Thus, although little processing time is wasted because said image data has already been accessed and loaded into main memory 207 when the first image data selection was performed, said re-selection places an unnecessary operational strain upon artist 100 operating mouse 105 or stylus 102 and tablet 103.

Upon performing said re-selection, the question of step 804 is answered positively, whereby control proceeds to step 806, wherein the image data recursively selected at step 801 may now be processed according to the data processing function selected at step 803. A second question is then asked at step 807, as to whether artist 100 should edit another portion of scene data 504. If the question of step 807 is answered positively, control is returned to step 801, wherein the re-selection problem stated above may repeatedly occur, for instance because said other image data should be processed with a data processing function belonging to yet another library. Alternatively, the question of step 807 is answered negatively, whereby a third and final question is asked as to whether another function should be selected to further edit the current image data.

If the question of 808 is answered positively, control is subsequently returned to step 803 for function selection, whereby the re-selection problem stated above again may repeatedly occur, for instance if said next selected function belongs to yet another library. Alternatively, the question of step 808 is answered negatively, whereby the scene may now be rendered according to step 506.

FIG. 9A

Figure 9A:
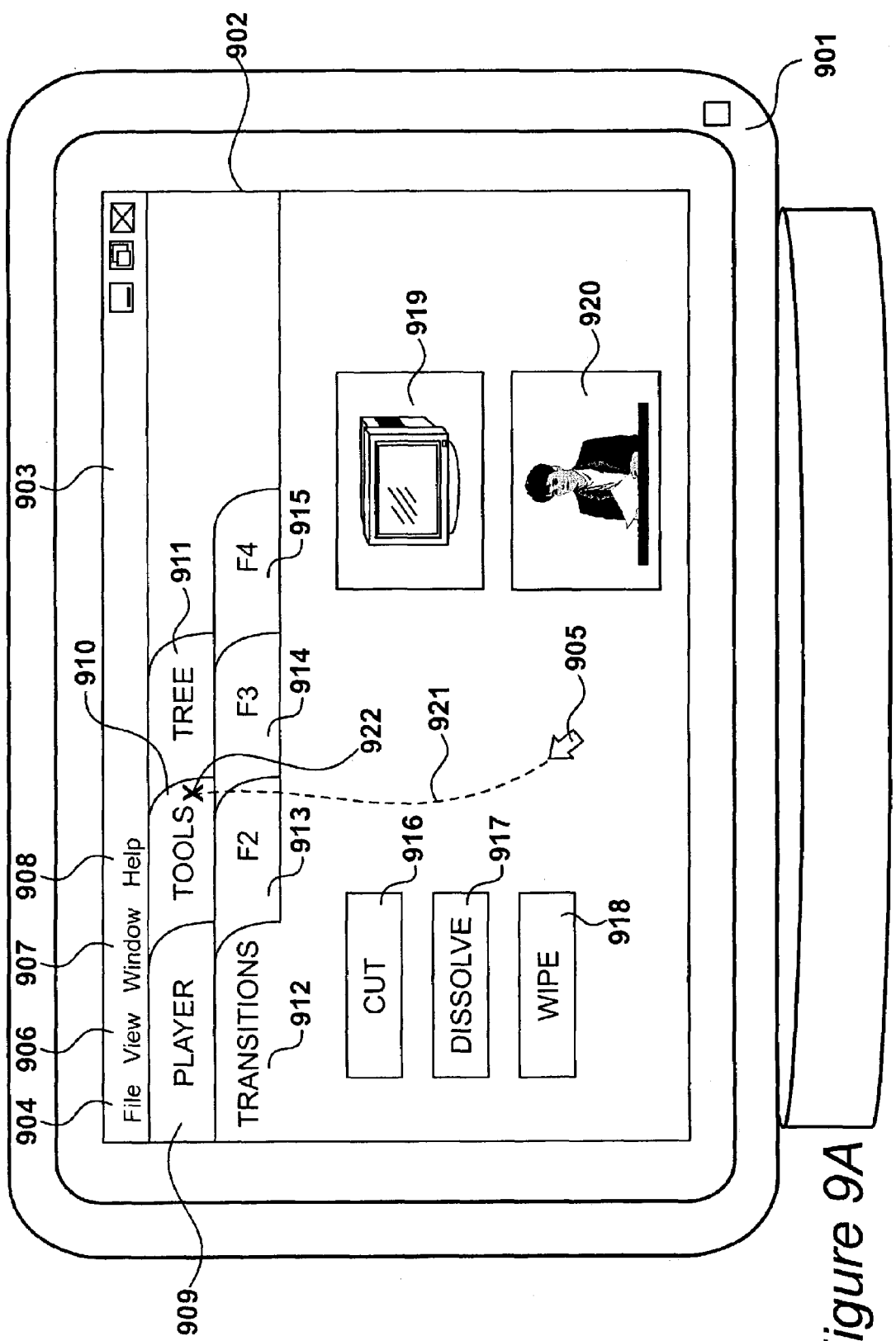
FIG. 9A illustrates the reselection shown in FIG. 8 by means of the graphical user interface of an image editing application configured to the known prior art.

The re-selection problem of the prior art system described in FIG. 8 is illustrated by means of the graphical user interface of an image editing application configured to the known prior art and shown in FIG. 9A.

A monitor 901 of said prior art system and not that shown in FIG. 1 displays the graphical user interface (GUI) 902 of an image processing application configured with image processing functions and libraries thereof. GUI 902 firstly comprises a conventional menu toolbar 903, having a plurality of function library representations thereon.

A first representation 904 defines a file management menu which, when selected by artist 100 by means of positioning GUI pointer 905 thereon with translating mouse 905 or stylus 102 over tablet 103 and subsequently effecting a mouse click or tapping said stylus 102 over said tablet 103, generates a conventional "dropdown" sub-menu configured with further representations of library functions, such as an "open file" function for instance. Menu bar 903 may include a plurality of further library representations, such as a view library 906, a window library 907 and a help library 908, which are well known to those skilled in the art. The taskbar 903 and menus thereof are a very common design and traditionally implemented in the majority of applications processed within the context of a multi-tasking operating system, such as the Windows®-based operating system of the preferred embodiment.

Within the specific context of an image-processing application, the representation of functions and groups thereof may eschew bar-type presentation in order to improve the visibility and contents of such groups with alternative structures. In the example, GUI 902 displays the specific image-processing functions and groups or libraries thereof as tabs, wherein main tabs 909 to 911 are library representations and sub-tabs 912 to 915 each represent a particularly function of a currently-selected main tab. Thus, the hierarchy of functions in relation to their respective libraries can be easily and intuitively understood by a user observing the main tabs and sub-tabs arrangement, which preferably mirrors the function hierarchy processed as described in FIG. 6.

In the example, main "player" tab 909 represents a "player" library of functions respectively represented by tabs 912 to 915, whereas main "tools" tab 910 and main "tree" tab 911 respectively represent a "tools" library of functions also respectively represented by corresponding sub-tabs, which replace sub-tabs 912 to 915 upon selection of said tab 910 by way of pointer 905, and a "tree" library similarly having functions represented by respective sub-tabs upon selection said tab 911 by way of pointer 905.

The "transitions" sub-tab 912 represents a frame sequence management function offering three distinct frame sequence processing methods 916 to 918, wherein activating the "cut" widget 916 by means of point 915 allows user 100 to specify a particular frame of a sequence of frames 919 selected and loaded according to steps 801 and 802 or a particular frame of another sequence of frames 920 similarly selected and loaded at said steps 801 and 802, at which frame sequence playback should stop and playback of the next frame sequence begins. Alternatively, activating a "dissolve" widget 917 allows user 100 to specify a number of frames of either sequence 919 or sequence 920, or both, over which to end the playback of said sequence 919 and begin the playback of sequence 920 if said sequences are to be merged in this order. Finally, activating a "wipe" widget 918 allows user 100 to specify a number of frames to insert between the last frame of sequence 919 and the first frame of sequence 920 to achieve a transition between said sequences as described above, but wherein respective frames of said sequences are not merged.

The cut, dissolve and wipe transition operations described above are well known to those skilled in the art and are used herein by way of example only. Similarly, player functions 913, 914 and 915 are shown for the purpose of illustration only and not further described for the purpose of not obscuring the present description unnecessarily.

In accordance with the description of image data editing according to the known prior art described in FIG. 8, if the workflow requires user 100 to subsequently color-correct the red, green and blue (RGB) color components of a particular frame of say frame sequence 919, said user 100 would select said color-correction function according to step 803 by means of translating pointer 905, for instance along a path 921, over to a portion 922 of the required "tools" tab 910.

FIG. 9B

Figure 9B:
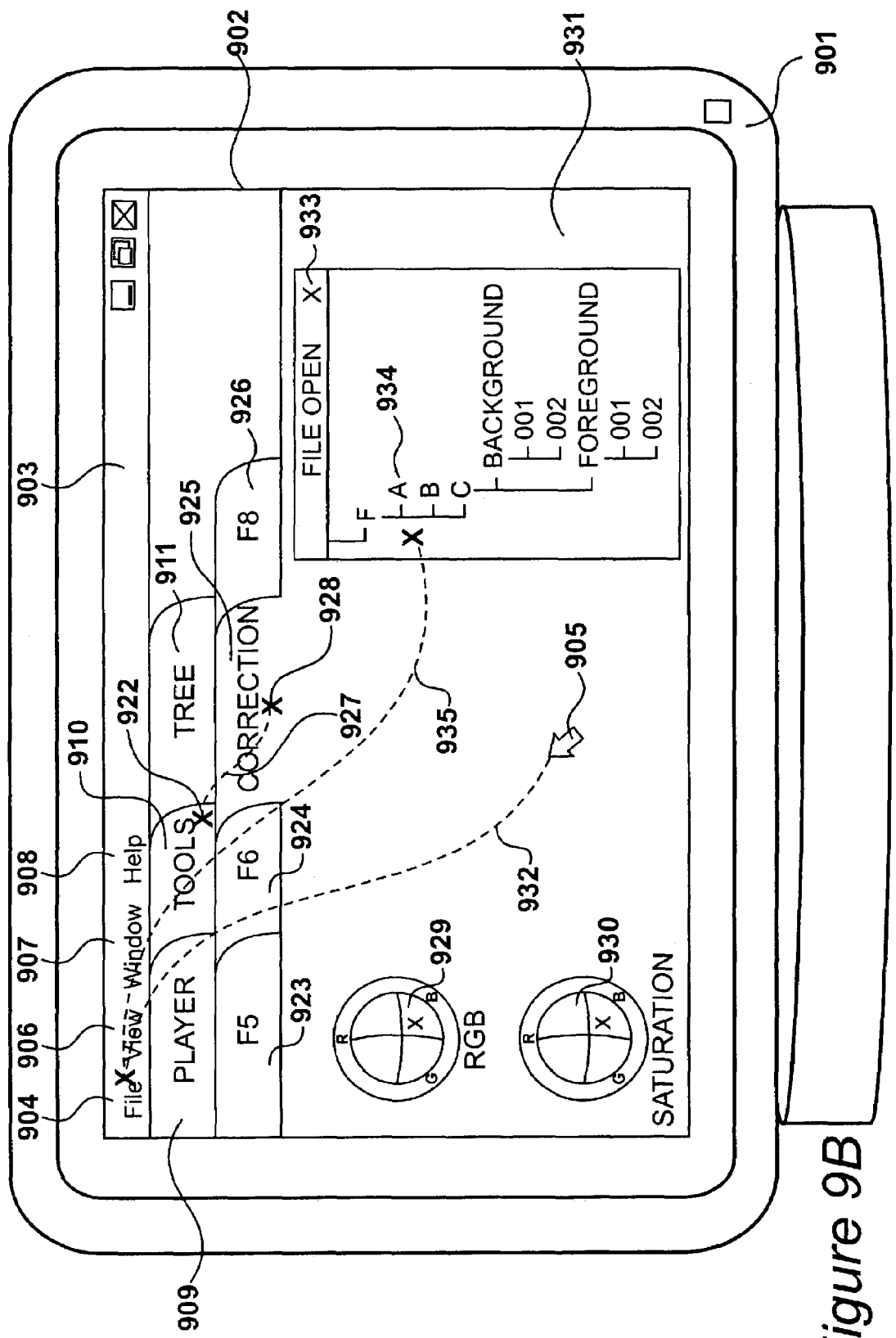
FIG. 9B further illustrates the graphical user interface of the prior art shown in FIG. 9A, including initializing an application state according to the known prior art.

The library loading step 805 described in FIG. 8 is illustrated in FIG. 9B wherein the selection 921, 922 of a different library 910 shown in FIG. 9A initializes an application state according to the known prior art.

The GUI 902 is again shown displayed on monitor 901, wherein user 100 has clicked on main "tools" tab 910 as described in FIG. 9A, such that the respective functions of the corresponding "tools" library are represented by respective sub-tabs 923 to 926. In the example, the third "correction" sub-tab 925 represents the color-correction function user 100 initiated the selection thereof described in FIG. 9A over path 921. Thus, upon positioning pointer 905 over portion 922 of main "tools" tab 910, said user 100 effects another translation along a path 927 over to a portion 928 of said "correction" sub-tab 925, wherein color-correction-specific "RGB" widget 929 and "saturation" widget 930 are displayed within the work space 931 of sub-tab 925.

In accordance with the description of steps 804 and 805 above, said workspace is initially empty, in that the color-correction function shown as 925 of the "tools" library shown as 910 requires "pointing" to frame sequence 919. Consequently, user 100 must translate pointer 905 along a path 932 over to the "file" menu of menu bar 903, whereby a conventional "pop-up" menu 933 is displayed over workspace 931 and itself configured to display the logical structure 934 of the storage location wherein said frame sequence 919 is stored, for instance framestore 107. Upon said pop-up menu 933 being displayed, user 100 should therefore yet again translate pointer 905 from the "file" menu 904 along a path 935 over to the portion of said logical file structure 934 representing said frame sequence 919, irrespective of the fact that said frame sequence 919 was already loaded in main memory 207 in order to effect any of operations 916 to 918 thereon.

It is thus clear that the re-selection shown as path 932, 935 resulting from alternative function selection 921, 922 is a time-consuming task, which induces operational strain over prolonged periods.

FIG. 10

Figure 10:
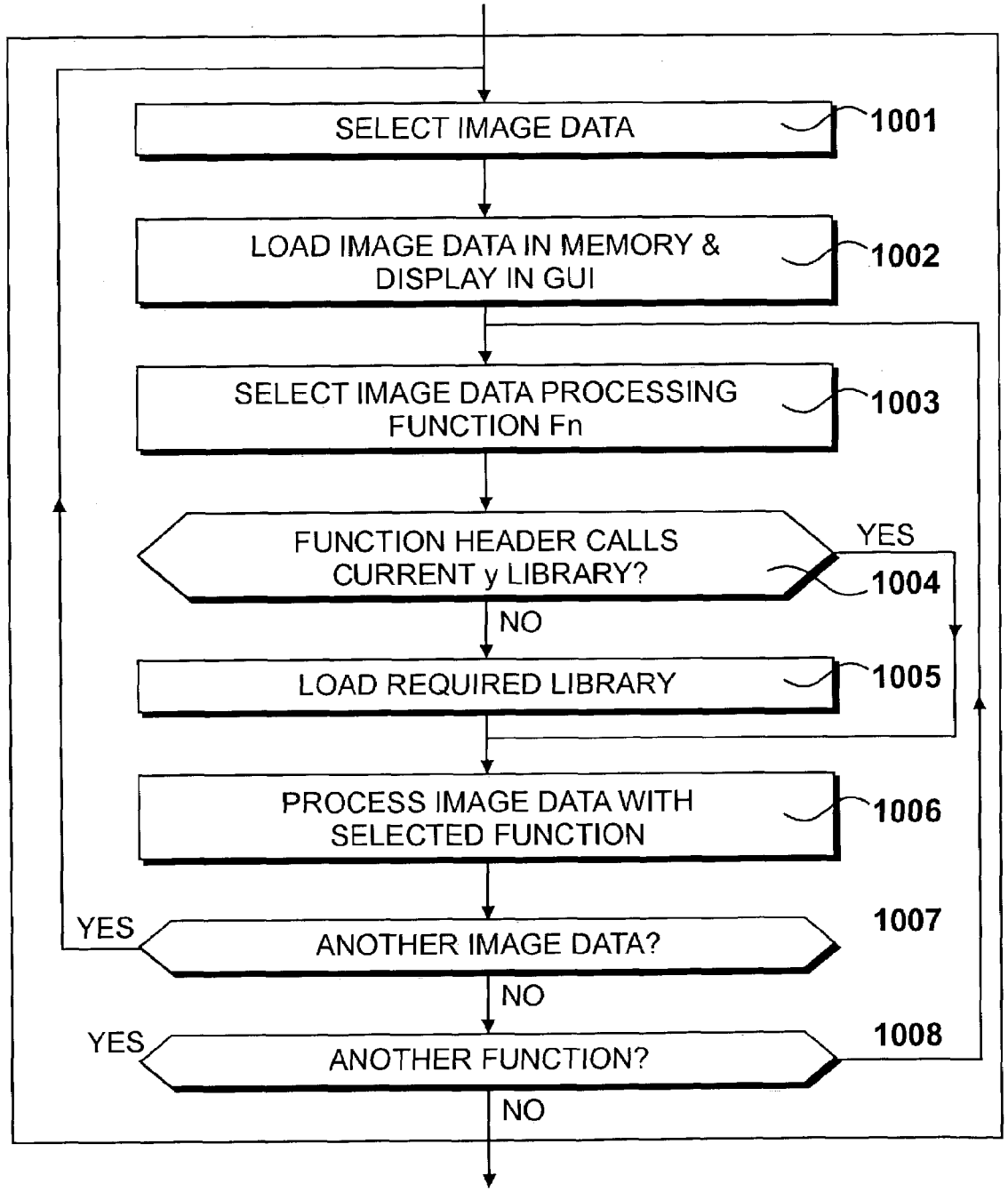
FIG. 10 details the processing step according to which the scene data shown in FIGS. 3 and 4 is edited in an image processing system according to the present invention, including a step of loading a library.

The processing step 505 according to which scene data 303 is edited as scene objects 401 to 407 in image processing system configured according to the present invention, is further described in FIG. 10.

Scene data 303 is preferably loaded as metadata when the corresponding scene graph 703, 704 is selected at step 504 and user 100 first selects image data 504 at step 1001 for processing, wherein said selection is preferably performed upon a representation of said scene data 504 generated from said metadata, whereby such a representation is known to those skilled in the art as a proxy, for instance a frame "thumbnail" image. Said selection is preferably performed by way of activation means implemented in the manual input means, such as, one or a plurality of electrically-switched, spring-loaded contact buttons of mouse 106 or tapping stylus 102 onto tablet 103.

Upon performing the selecting step 1001, the actual scene data is accessed, for instance an image frame 707 or a sequence 919 or 920 thereof stored at framestore 107, and loaded in main memory 207 at the next step 1002. Again, whilst the representation of said scene data loaded at step 1002 may not differ within the GUI of the application according to the present invention, wherein the image frame 707 or sequence thereof remains represented as an image thumbnail, said representation now points to data stored in main memory 207 and readily processible by CPUs 201, 202.

User 100 may now select an appropriate image data processing function Fn with which to process said loaded image data at the next step 1003 and, upon performing said function selection, a question is asked at step 1004 as to whether the header of said function Fn calls the library upon which the current application state is based, as described in FIG. 6. In other words, upon user 100 selecting a data processing function, the dependency or the dependencies thereof are looked-up in order to determine if said selected function inherits data definition and one or a plurality of group-wide characteristic from said current library in order to process the image data selected at step 1001.

If the question of step 1004 is answered negatively, the library required for the function Fn selected at step 1003 to process the image data selected at step 1001 must be loaded at the next step 1005, whereby in the image processing system configured to the present invention, said loading step 1005 does not require user 100 to perform the re-selection described in FIGS. 8 to 9B.

Indeed, the library loading step 1005 according to the present invention generates a new application state, wherein the function Fn requiring an alternative library selected at step 1003 and graphical user interface thereof is initialized with the image data selected at step 1001 and loaded at step 1002 as its default data. In effect, the selected function Fn within the newly-loaded library is "pointed" to the image data it must process, without requiring any further user input. Upon performing said library loading according to the present invention, control proceeds to step 1006, wherein the image data selected at step 1001 may now be processed according to the data processing function Fn selected at step 1003. Alternatively, the question of step 1004 is answered positively in the first place, whereby control also proceeds to said step 1006.

A second question is then asked at step 1007, as to whether artist 100 should edit another portion of scene data 504. If the question of step 1007 is answered positively, control is returned to step 1001, wherein new image data is selected and subsequently loaded at step 1002. The re-selection problem of the prior art is avoided if said new image data should be processed with a data processing function Fn+1 belonging to yet another library, because said new image data will be the default data when loading said other library, as described according to step 1005. Alternatively, the question of step 1007 is answered negatively, whereby a third and final question is asked at 1008 as to whether another function Fn+1 should be selected to further edit the current image data.

If the question of 1008 is answered positively, control is subsequently returned to step 1003 for function Fn+1 selection, whereby the re-selection problem is again avoided if said next selected function Fn+1 belongs to yet another library, because the current image data will be the default data when loading said other library, as described according to step 1005. Alternatively, the question of step 1008 is answered negatively, whereby the scene may now be rendered according to step 506.

FIG. 11

Figure 11:
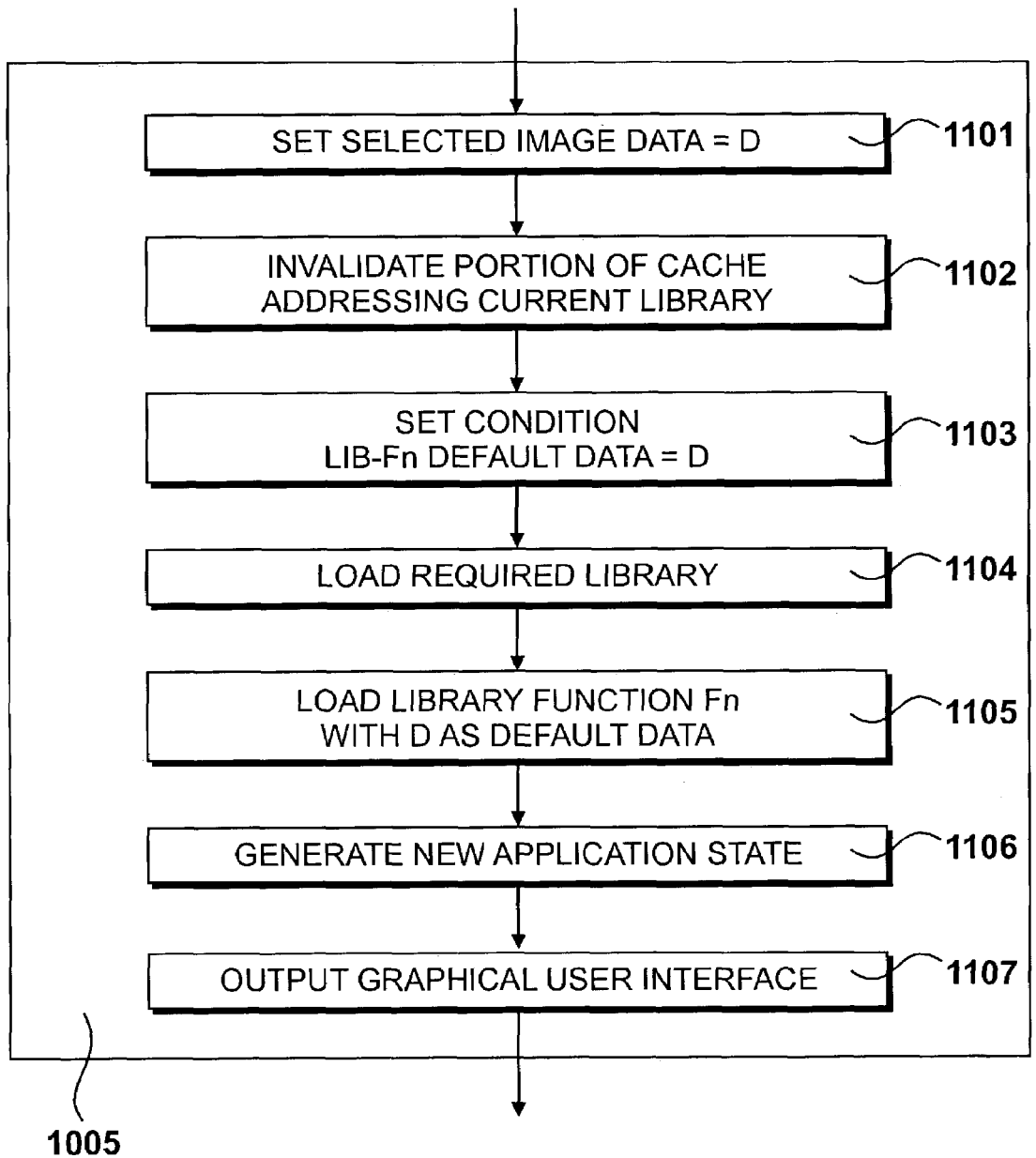
FIG. 11 further details the operational steps according to which the library shown in FIG. 10 is loaded, including a step of invalidating a memory cache.

The operational steps according to which alternative libraries are loaded at step 1005 according to the present invention are further described in FIG. 11.

At step 1101, application 702 defines a data pointer D to identify the image data 504 selected at step 1001. At step 1102, the respective portions of caches 205, 206 addressing the currently-loaded library and functions thereof are both invalidated, such that the released registers may be pointed to the required library and functions thereof when eventually loaded.

At step 1103, application 702 sets a data-defining condition prior to said loading of said required library, which tags the data pointer D as the default data for the image data processing function Fn selected at previous step 1003 requiring the loading of said required library. Upon setting this condition, said required library is loaded at the next step 1104 and said function Fn selected at step 1003 subsequently loaded at the next step 1105 with the image data 504 selected at step 1001 as its default data, the default, unity data of said function Fn having being replaced by way of said data pointer D.

In accordance with the description of the application runtime environment in FIG. 6, a new application state is therefore generated at step 1106 such that the graphical user interface of the application 702 according to the present invention is correspondingly updated and output at the next step 1107, thus wherein the function Fn selected at step 1003 and requiring the loading of an alternative library is represented within the context of said library and the image data selected at step 1001 and loaded at step 1002 is displayed within the workspace, e.g. workspace 931, of said function Fn within said context, thus readily processable by said function Fn.

FIG. 12

Figure 12:
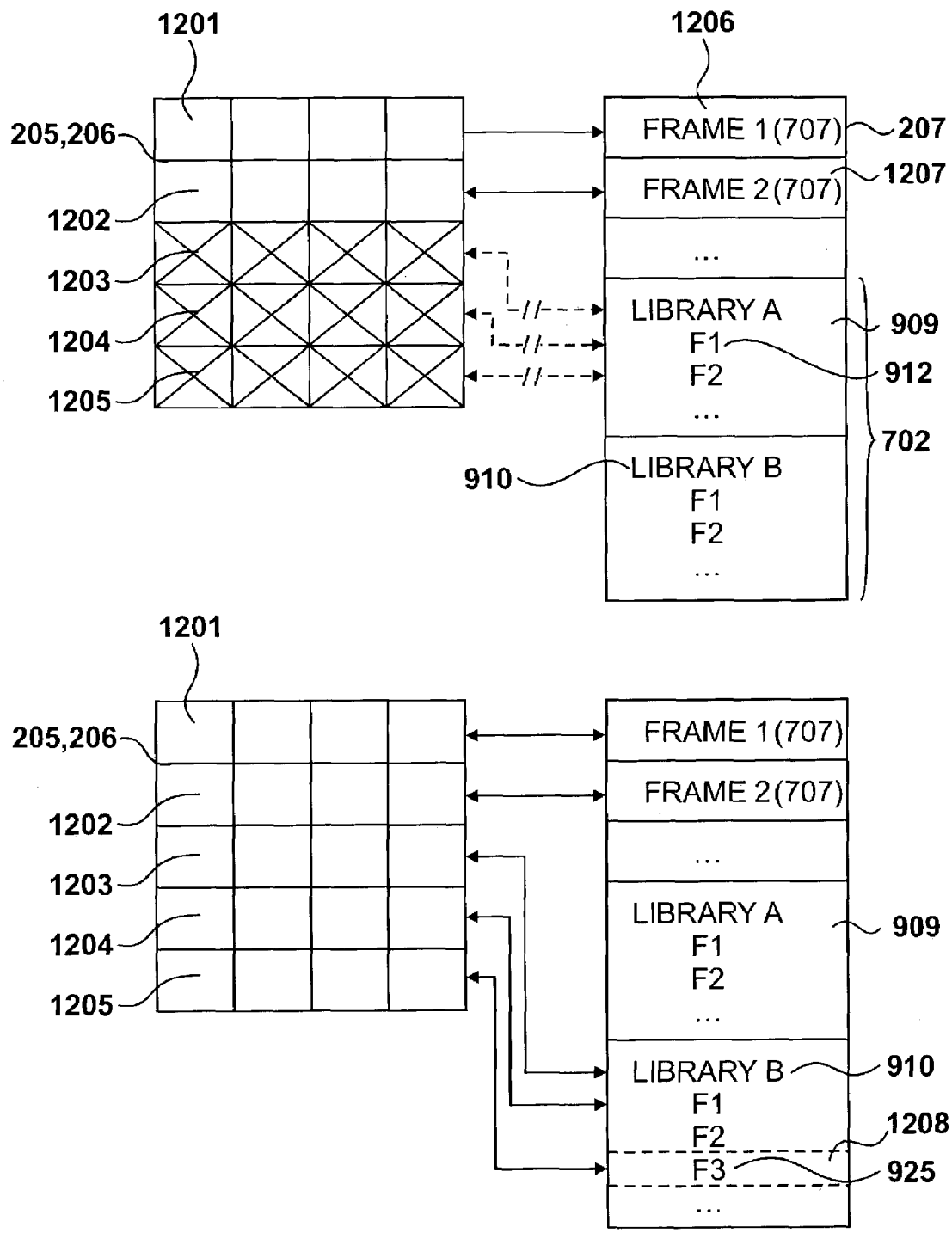
FIG. 12 illustrates the cache invalidation step shown in FIG. 11.

The cache invalidation step 1102 described in FIG. 11 is illustrated in FIG. 12.

Partial cache invalidations techniques are known to those skilled in the art and it will be readily apparent that the present invention may be implemented without the benefit of such techniques, which are used herein for the purpose of improving data access time and therefore are thus are not limitative herein. Having regard to the dual-processor and cache architecture described in the preferred embodiment of the present invention in FIG. 2, it will be similarly apparent to those skilled in the art that the present invention may be implemented within a single-processor and cache architecture, whereby said dual-processor and cache architecture is similarly preferred to improve the processed data output rate with benefiting from the Hyper-Threading™ technology developed by the Intel® Corporation, which is thus not limitative herein.

Caches, 205, 206 are shown with cache registers 1201 to 1205, wherein each of said cache registers references a portion of main memory 207, defined in terms of data blocks. In the example, cache register 1201 references and points to the group of data blocks respectively storing a first frame 1206 of frame sequence 919 generated from a node 404 and loaded at step 1002. Similarly, cache register 1202 references and points to a second frame 1207 of said sequence 919 also generated by node 404 and uploaded at said step 1002, and so on and so forth.

Conversely, cache register 1203 has been invalidated according to step 1102, thus does not reference and point anymore to a first group of data blocks of memory 207 storing data defining the "player" library 909, for instance. Similarly, cache register 1204 has been invalidated according to step 1102 and does not reference or point anymore to a second group of data blocks storing data defining the first "transitions" function 912 of said "player" library 909 and cache register 1205 has been invalidated and does not reference and point anymore to yet another group of data blocks defining yet another function of said "player" library 909, and so on and so forth.

However, subsequently to generating the new application state according to step 1106, cache registers 1201 and 1202 of caches 205, 206 still respectively reference and point to frames 1206 and 1207, whilst cache register 1203 now references and points to a first group of data blocks defining the "tools" library 910. Similarly, cache registers 1204 and 1205 respectively reference and point to groups of data blocks defining functions of said "tools" library 910. For instance, cache register 1205 is shown as referencing and pointing to a group of data blocks 1208 defining the "color-correction" function 925 of said "tools" library 910.

FIG. 13

The selection step 1003 of a function requiring the loading of an alternative library according to steps 1004 and 1005 is illustrated by means of the graphical user interface of an image editing application 702 configured according to the present invention.

The monitor 104 of system 101 configured according to the present invention and not that shown in FIGS. 9A and 9B displays the graphical user interface (GUI) 902 of image processing application 702 with image processing functions 912 to 915 and the library 909 thereof, along with further libraries 910, 911.

In the example, the workflow of user 100 specifies that a frame 1206 of frame sequence 919 or all of the frames thereof should be color-corrected further to implement any of transition functions 916 to 918 but prior to outputting the final sequence 303 at step 506. The selection of the appropriate color-correction function therefore requires user 100 to select main "tools" tab 910 and, in accordance with the preferred embodiment of the present invention, user 100 first selects the thumbnail of sequence 919 with pointer 905 by translating said pointer along a path 1301 over to a portion 1302 of said thumbnail, according step 1001. The image data represented by said thumbnail is already stored in main memory 207 after performing any of transition functions 916 to 918.

In the preferred embodiment of the present invention, user 100 then selects said main tab 910 by way of translating said thumbnail 919 along a path 1303 over to a portion 922 thereof, with preferably maintaining such the mouse button depressed or the stylus 102 in contact with tablet 103 after effecting said depression or contact at step 1001. The translation of said thumbnail 919 is illustrated along said path 1303 at 1304, as the hashed perimeter of said thumbnail being translated by the hashed perimeter of said pointer.

FIG. 14

Figure 13:
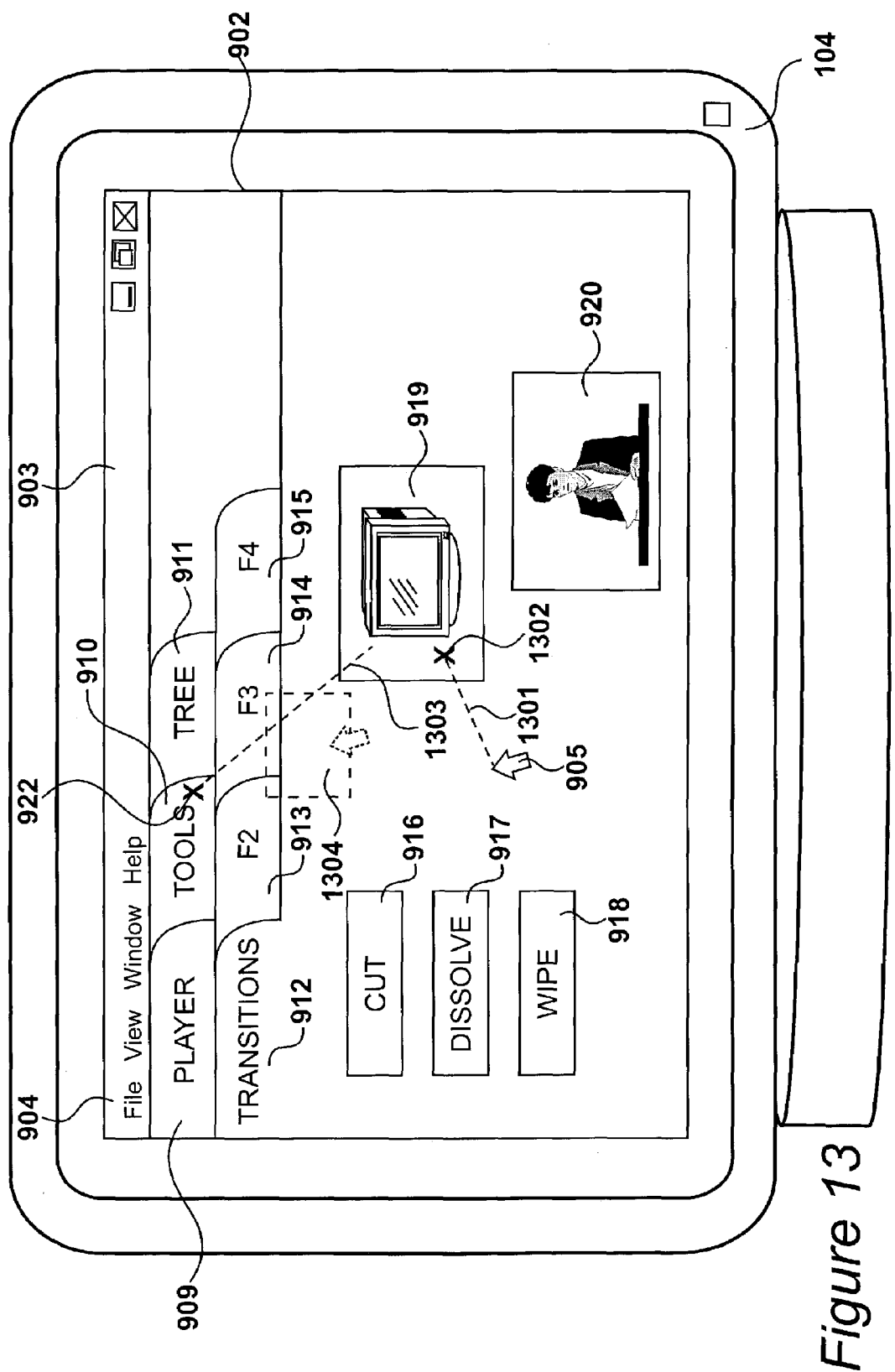
FIG. 13 shows the graphical user interface shown in FIG. 9A configured according to the present invention, including a step of selecting a function requiring the loading of an alternative library.

The loading of a function requiring the loading step 1005 of an alternative library, the selection of which is shown in FIG. 13, is illustrated by means of the graphical user interface shown in FIG. 13, wherein the state of application 702 has been updated according to the present invention.

In accordance with the description of FIG. 9B, the "tools" library represented by main tab 910 includes the colour-correction function represented by sub-tab 925, which is the function of interest to user 100.

According to the preferred embodiment of the present invention, upon completing the translation of thumbnail 919 over tab 910, the question of step 1004 is answered negatively, whereby said "tools" library is loaded according to steps 1101 to 1106 and a new application state is generated at step 1106, wherein the functions 923 to 926 of said library are initialized with image frame sequence 919 as default data. The corresponding GUI 902 replaces the "player" library sub-tabs 912 to 915 with the "tools" library sub-tabs 923 to 926.

According to the preferred embodiment of the present invention still, upon completing the GUI update, user 100 translates pointer 905 from portion 922 to a portion 1401 of "colour-correction" sub-tab 925 over a path 1402. Preferably, user 100 subsequently releases the depressed mouse button or releases stylus 102 from tablet 103, whereby the workspace 1403 of said function already includes default data, i.e. image frame sequence 919.

Application 702 processes the mouse button release or stylus 102 and tablet 103 logical interrupt as function Fn selection step 1003, whereby question 1004 is answered positively. User 100 may now interact with colour-correction widgets 929 and/or 930 in order to process the red, green and blue colour component values frame 1206 or the complete sequence 919.

FIG. 15

An alternative embodiment of the selection step 1003 of a function requiring the loading of an alternative library according to steps 1004 and 1005 is illustrated by means of the graphical user interface of an image editing application 702 configured according to the present invention.

The monitor 104 of system 101 configured according to the present invention and not that shown in FIGS. 9A and 9B displays the graphical user interface (GUI) 902 of image processing application 702 with image processing functions 912 to 915 and the library 909 thereof, along with further libraries 910, 911.

In the example, the workflow of user 100 specifies that the respective image frames of both frame sequence 919 and frame sequence 920 should be color-corrected further to implement any of transition functions 916 to 918 but prior to outputting the final sequence 303 at step 506. The selection of the appropriate color-correction function therefore requires user 100 to select main "tools" tab 910 and, in accordance with the alternative embodiment of the present invention, user 100 first selects both the thumbnails of sequences 919, 920 with pointer 905 by translating said pointer along a path 1501 over to a portion 1502 of the workspace 1503 of "transitions" function 912. Application 702 processes the start and end X,Y screen co-ordinates of pointer 905, which is preferably translated with mouse 107 having a button depressed along said path 1501 or stylus 102 in contact with tablet 103 along said path 1501, in order to define a bounding box 1504 logically grouping sequences 919, 920 as image data selected at step 1001. The image data represented by said thumbnails is already stored in main memory 207 after performing any of transition functions 916 to 918.

Figure 14:
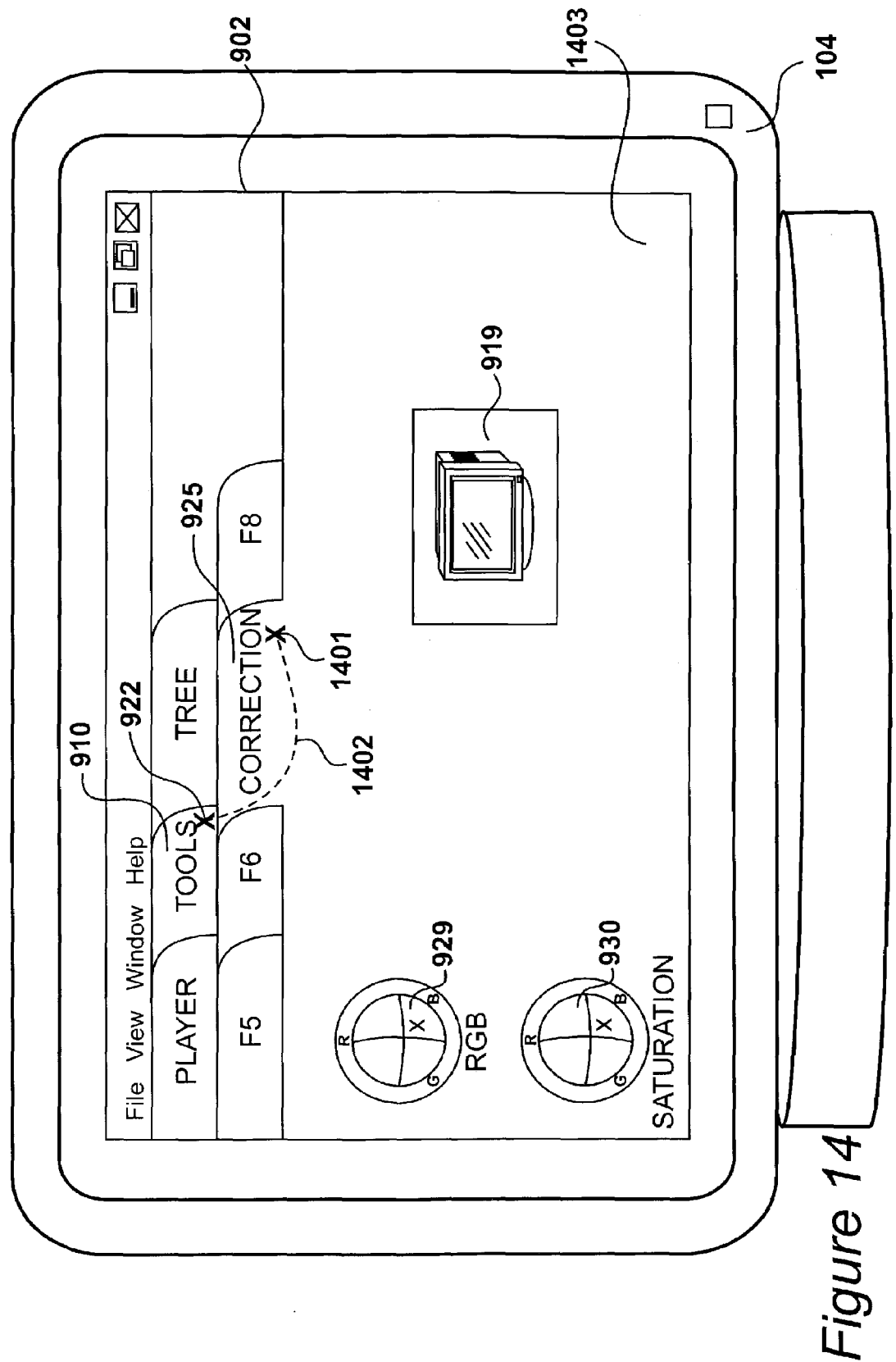
FIG. 14 shows the graphical user interface shown in FIG. 13, including a step of loading an alternative library.
Figure 15:
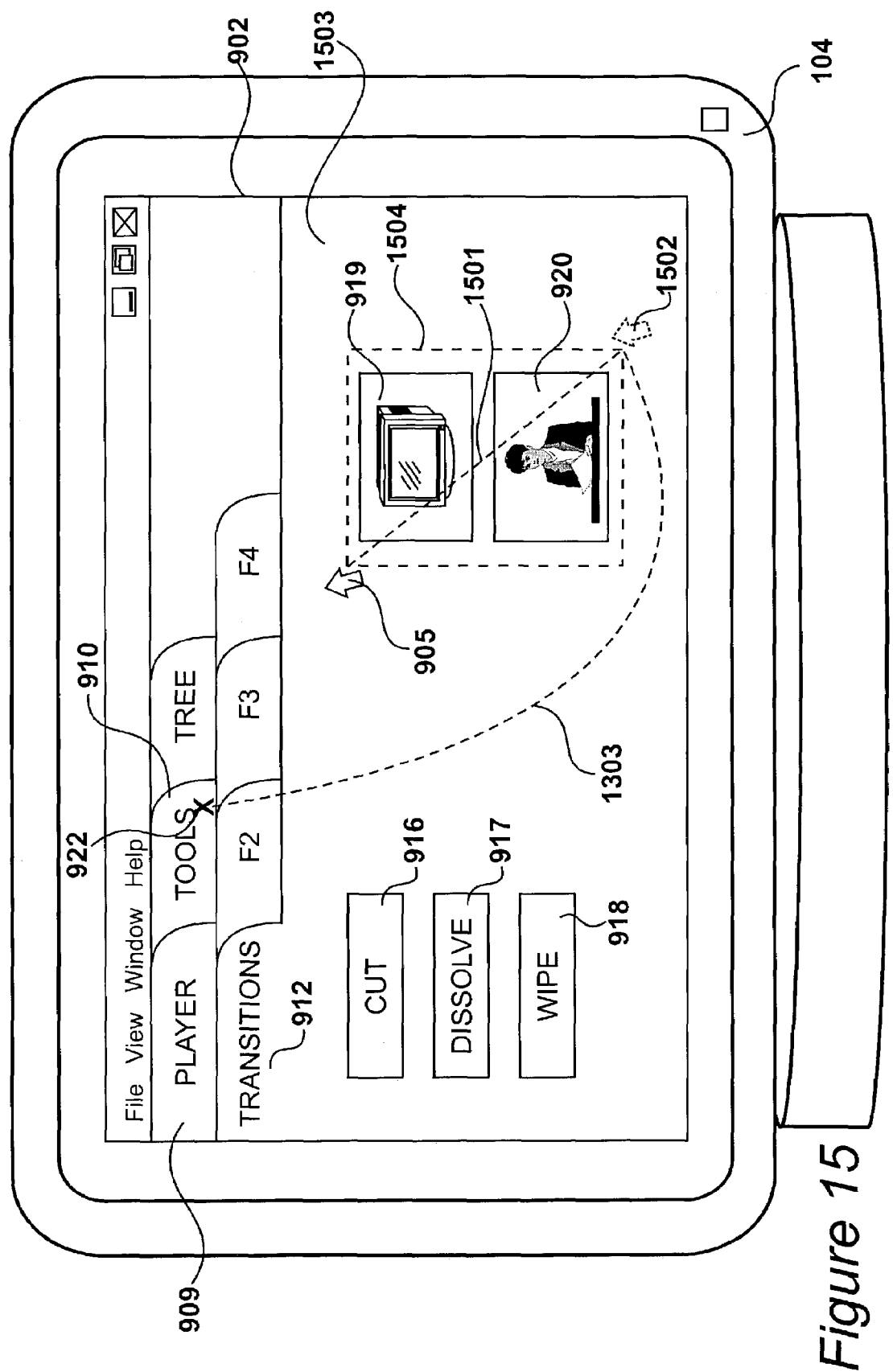
FIG. 15 shows an alternative embodiment of the present invention.

In the alternative embodiment of the present invention still, user 100 then selects said main tab 910 by way of translating said bounding box 1504 along path 1303 over to a portion 922 thereof. In accordance with the description of FIG. 14, upon completing the GUI update, user 100 translates pointer 905 from portion 922 to the portion 1401 of "colour-correction" sub-tab 925 over the path 1402. Preferably, user 100 subsequently releases the depressed mouse button or releases stylus 102 from tablet 103, whereby the workspace 1403 of said function already includes default data, i.e. image frame sequences 919 and 920.

Application 702 processes the mouse button release or stylus 102 and tablet 103 logical interrupt as function Fn selection step 1003, whereby question 1004 is answered positively. User 100 may now interact with colour-correction widgets 929 and/or 930 in order to process the red, green and blue colour component values of frames of sequence 919 and/or sequence 920.

The invention claimed is:

1. Apparatus for processing image data, comprising memory means, processing means, display means and manually operable input means configured with activation means, wherein said memory means stores said image data and instructions and said processing means is configured by said instructions to perform the steps of:
   displaying, on said display means, a hierarchy of image data processing functions implemented within an image processing application, wherein said hierarchy sorts the image data processing functions into groups based on interdependencies between the image data processing functions;
   selecting image data by placing a pointer operated by said input means over a representation of the image data within a graphical user interface displayed on said display means and activating said activation means;
   translating said representation of the image data over a first group of the groups in the hierarchy by means of said pointer;
   in response to said translating, initialising image data processing functions in the first group with said selected image data as default data;
   in response to said initialising, updating said graphical user interface;
   wherein in response to deactivating said activation means, said image data processing functions in the first group are configured to process said image data according to input received from said input means and an updated representation of said graphical user interface includes a representation of said image data displayed within said first group of said hierarchy.

2. Apparatus according to claim 1, wherein each of said groups in said hierarchy comprises a tab or sub-tab.

3. Apparatus according to claim 1, wherein said representation of image data is a proxy or a thumbnail.

4. Apparatus according to claim 1, wherein said selected image data includes a plurality of image frames known as a sequence.

5. Apparatus according to claim 4, wherein said selected image data includes a plurality of sequences.

6. Apparatus according to claim 1, wherein:
   in response to said translating, a node is added to a process tree, said process tree representing image processing performed on a scene; and
   said node represents one of the image data processing functions configured with said selected image data s default data.

7. A method of selecting an image processing function via a graphical user interface for receiving input commands from manually operated input means configured with activation means, wherein:

a hierarchy of image data processing functions implemented within an image processing application are displayed on a display means, wherein said hierarchy sorts the image data processing functions into groups based on interdependencies between the image data processing functions;

image data is selected by placing a pointer operated by said input means over a representation of the image data within said graphical user interface and activating said activation means;

the representation of the image data is translated over a first group of the groups in the hierarchy by means of said pointer;

in response to said translation of said representation of the image data said image processing function in the first group is initialised with said selected image data as default data;

in response to said initialisation, said graphical user interface is updated; and in response to said deactivating said activation means, said image data processing functions in the first group are configured to process said image data according to input received from said input means, wherein an updated representation of said graphical user interface includes a representation of said image data displayed within said first group of said hierarchy.

8. A method according to claim 7, wherein each of said groups in said hierarchy comprises a tab or sub-tab.

9. A method according to claim 7, wherein said representation of image data is a proxy or a thumbnail.

10. A method according to claim 7, wherein said selected image data includes a plurality of image frames known as a sequence.

11. A method according to claim 10, wherein said selected image data includes a plurality of sequences.

12. A method according to claim 7, wherein:

in response to said translating, adding a node to a process tree, said process tree representing image processing performed on a scene; and said node represents one of the image data processing functions configured with said selected image data s default data.

13. A computer-readable medium carrying instructions for processing image data which, when processed by a computer including display means and manually operated input means configured with activation means, configure said computer to perform the steps of:

displaying, on said display means, a hierarchy of image data processing functions implemented within an image processing application, wherein said hierarchy sorts the image data processing functions into groups based on interdependencies between the image data processing functions;

selecting image data by placing a pointer operated by said input means over a representation of the image data within a graphical user interface displayed on said display means and activating said activation means;

translating said representation of image data over a first group of the groups in the hierarchy by means of said pointer;

in response to said translating, initialising said image data processing functions in the first group with said selected image data as default data;

in response to said initialising, updating said graphical user interface; wherein in response to deactivating said activation means, said image data processing functions in the first group are configured to process said image data according to input received from said input means and an updated representation of said graphical user interface includes a representation of said image data displayed within said first group of said hierarchy.

14. A computer-readable medium according to claim 13, wherein each of said groups in said hierarchy comprises a tab or sub-tab.

15. A computer-readable medium according to claim 13, wherein said selected image data includes a plurality of image frames known as a sequence.

16. A computer-readable medium according to claim 15, wherein said selected image data includes a plurality of sequences.

17. A computer readable medium according to claim 13, wherein:

in response to said translating, a node is added to a process tree, said process tree representing image processing performed on a scene; and said node represents one of the image data processing functions configured with said selected image data s default data.

18. A computer programmed for processing image data, said computer comprising memory means, processing means, display means and manually operable input means configured with activation means, wherein said memory means stores said image data and instructions and said computer is configured by said instructions to perform the steps of:

displaying, on said display means, a hierarchy of image data processing functions implemented within an image processing application, wherein said hierarchy sorts the image data processing functions into groups based on interdependencies between the image data processing functions;

selecting image data by placing a pointer operated by said input means over a representation of said image data within a graphical user interface displayed on said display means and activating said activation means;

translating said representation of the image data over a first group of the groups in the hierarchy by means of said pointer;

in response to said translating, initialising said image data processing functions in the first group function according to said hierarchy with said selected image data as default data;

in response to said initialising, updating said graphical user interface;

wherein in response to deactivating said activation means, said image data processing functions in the first group are configured to process said image data according to input received from said input means and an updated representation of said graphical user interface includes a representation of said image data displayed within said first group of said hierarchy.

19. A computer programmed according to claim 18, wherein said selected image data includes a plurality of image frames known as a sequence.

20. A computer programmed according to claim 19, wherein said selected image data includes a plurality of sequences.

21. A computer programmed according to claim 18, wherein:
in response to said translating, a node is added to a process tree, said process tree representing image processing performed on a scene; and
said node represents one of the image data processing functions configured with said selected image data s default data.

* * * * *

UNITED STATES PATENT AND TRADEMARK OFFICE
CERTIFICATE OF CORRECTION

PATENT NO. : 7,318,203 B2  
APPLICATION NO. : 10/407022  
DATED : January 8, 2008  
INVENTOR(S) : Gary Purves et al.

Page 1 of 1

It is certified that error appears in the above-identified patent and that said Letters Patent is hereby corrected as shown below:

In the Claims

Column 18, line 52, Claim 18, please delete the phrase "function according to said hierarchy".

Signed and Sealed this
Twentieth Day of May, 2014

Michelle K. Lee
*Deputy Director of the United States Patent and Trademark Office*